(12) United States Patent
Shotey et al.

(10) Patent No.: US 8,633,384 B1
(45) Date of Patent: Jan. 21, 2014

(54) EXTENDING ELECTRICAL BOX

(75) Inventors: Marcus J. Shotey, Scottsdale, AZ (US); Jeffrey P. Baldwin, Phoenix, AZ (US)

(73) Assignee: Hubbell Incorporated, Shelton, CT (US)

( * ) Notice: Subject to any disclaimer, the term of this patent is extended or adjusted under 35 U.S.C. 154(b) by 228 days.

(21) Appl. No.: 12/908,619

(22) Filed: Oct. 20, 2010

Related U.S. Application Data

(60) Provisional application No. 61/253,395, filed on Oct. 20, 2009.

(51) Int. Cl.
*H01H 9/02* (2006.01)

(52) U.S. Cl.
USPC .................................. 174/53; 174/50; 174/58

(58) Field of Classification Search
USPC ........... 174/50, 53, 58, 64, 535, 480, 481, 57, 174/63; 220/3.2–4.02; 248/906; 439/535
See application file for complete search history.

(56) References Cited

U.S. PATENT DOCUMENTS

| | | | |
|---|---|---|---|
| 1,275,692 A | 8/1918 | Hubbell | |
| 1,345,502 A | 7/1920 | Newton | |
| 4,634,015 A * | 1/1987 | Taylor | 220/3.7 |
| 5,012,043 A | 4/1991 | Seymour | |
| 5,289,934 A * | 3/1994 | Smith et al. | 220/3.7 |
| 6,533,225 B1 * | 3/2003 | Berges et al. | 248/27.1 |
| 6,717,050 B2 * | 4/2004 | Laflamme et al. | 174/50 |
| 7,067,736 B1 * | 6/2006 | Lemke | 174/50 |
| 7,312,395 B1 | 12/2007 | Gretz | |
| 7,531,743 B2 | 5/2009 | Johnson et al. | |
| 7,544,889 B1 | 6/2009 | Sanchez | |
| 7,582,827 B1 | 9/2009 | Gretz | |
| 2002/0011345 A1 * | 1/2002 | Reiker | 174/50 |
| 2003/0189043 A1 * | 10/2003 | Wegner et al. | 220/4.03 |
| 2005/0051546 A1 * | 3/2005 | Dinh | 220/3.7 |
| 2008/0073100 A1 * | 3/2008 | Magisano et al. | 174/50 |
| 2009/0183891 A1 * | 7/2009 | Kramer, Jr. | 174/57 |

* cited by examiner

*Primary Examiner* — Boris L. Chervinsky
*Assistant Examiner* — Pete Lee
(74) *Attorney, Agent, or Firm* — Kyle G. Hepner; Mark S. Bicks; Alfred N. Goodman

(57) ABSTRACT

An electrical box including an outer shell having at least four sides extending from a rear wall to an open top at a front surface and a box mounting tab protruding from two of the at least four sides, an inner shell having at least four sides, a front surface, and at least two device securing protrusions each having an aperture adjacent to each of the at least two sides, each device securing aperture including an opening extending toward the open top of the electrical box, the inner shell movable within the outer shell in a direction away from the rear wall, and wherein the inner shell front surface and the outer shell front surface are coplanar when the inner shell is in a rearmost position.

11 Claims, 6 Drawing Sheets

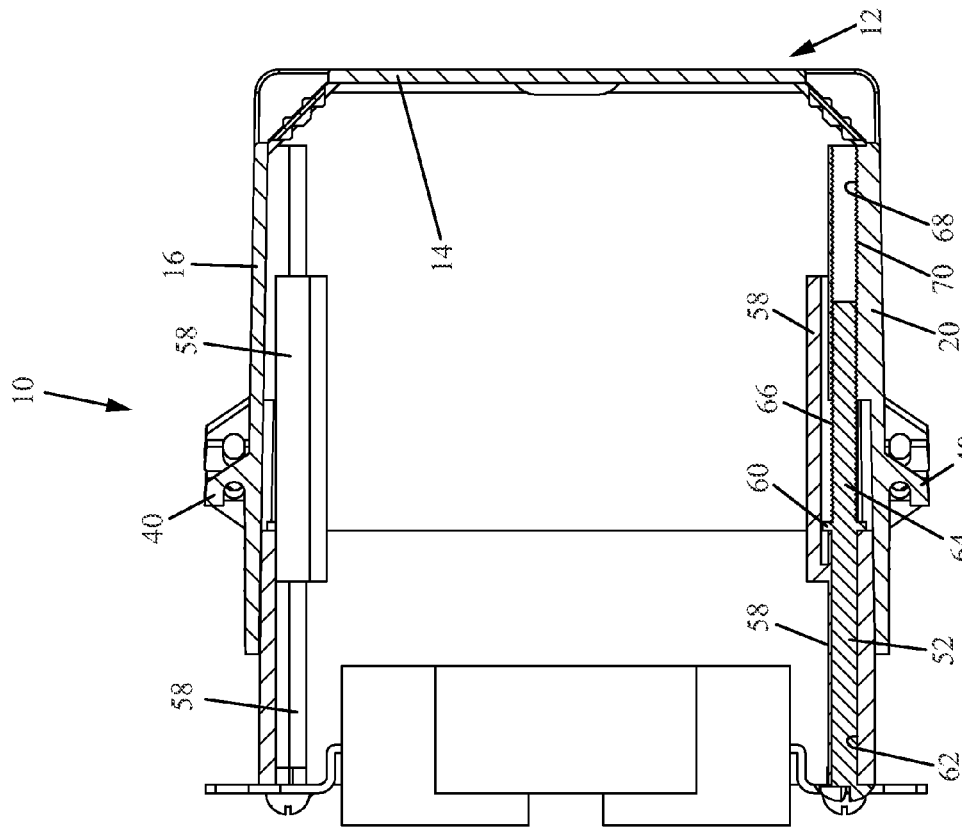
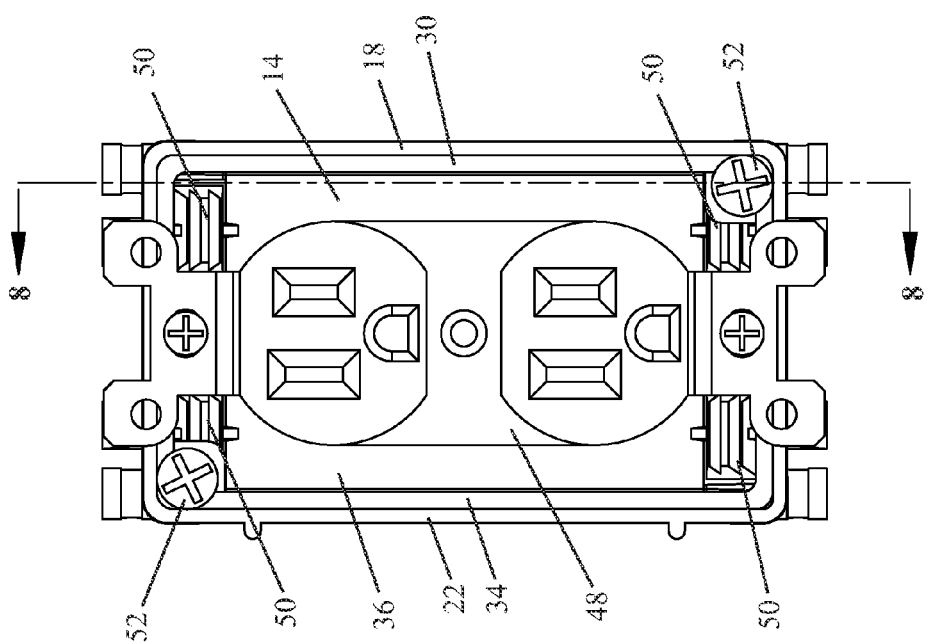

EXTENDING ELECTRICAL BOX

CROSS REFERENCE TO RELATED APPLICATIONS

This application claims the benefit of the filing date of U.S. Provisional Patent Application 61/253,395 entitled "Extending Electrical Box" to Marcus Shotey, et al. which was filed on Oct. 20, 2009, the contents of which are hereby incorporated herein by reference.

BACKGROUND

1. Technical Field

Aspects of this document relate generally to electrical boxes.

2. Background Art

Electrical boxes are conventionally used to mount and house one or more electrical devices within a wall or other structure. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall.

SUMMARY

Aspects of this document relate to electrical boxes. In one aspect, an electrical box includes an outer shell having at least four sides extending from a rear wall to an open top at a front surface and a box mounting tab protruding from two of the at least four sides, an inner shell having at least four sides, a front surface, and at least two device securing protrusions each having an aperture adjacent to each of the at least two sides, each device securing aperture comprising an opening extending toward the open top of the electrical box, the inner shell movable within the outer shell in a direction away from the rear wall, and wherein the inner shell front surface and the outer shell front surface are coplanar when the inner shell is in a rearmost position.

Particular implementations may comprise one or more of the following features. The electrical box may further comprise an electrical device movable with the inner shell. The inner shell may be slidable within the outer shell. The outer shell may include a track and the inner shell may include a guide. The track may be mated with the guide to move the inner shell. The guide and the track may be complimentary shaped. The track may include a plurality of threads. The guide may include a threaded rod engaged with the plurality of track threads. The guide may be a screw. The screw may retain a relative position with respect to the inner shell. The inner shell may be moved away from the back wall prior to mounting an electrical device within the inner shell. The inner shell may be moved away from the back wall after mounting an electrical device within the inner shell. The screw may be manipulated through the inner shell open top.

In another aspect, an electrical box includes an outer shell having at least four sides with an open top, a front surface, and a box mounting tab on two sides, an inner shell having at least four sides extending from a rear wall to an open top and a front surface, and at least two device securing protrusions each having an aperture adjacent to each of at least two sides, each device securing aperture comprising an opening extending toward the open top of the electrical box, the inner shell is movable within the outer shell in a direction away from the outer shell, and wherein the inner shell front surface and the outer shell front surface are coplanar when the inner shell is in a rearmost position.

Particular implementations may comprise one or more of the following features. The outer shell may include a track and the inner shell may include a guide. The track may be mated with the guide to move the inner shell. The guide may be a screw. Rotation of the screw may be translated into linear movement of the inner shell. The track may be mated with the guide to move the inner shell.

In still another aspect, a method of mounting includes the steps of providing an electrical box including an outer shell with mounting tabs on at least two surfaces, a track, and a front surface, an inner shell within the outer shell with at least two device mounting apertures, a front surface, and a guide engaged with the track, the outer shell front surface and the inner shell front surface being coplanar when the inner shell is in a rearmost position, securing the electrical box to a wall through the mounting tabs, and manipulating the guide through the inner shell to move the inner shell forward relative to the outer shell.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 7 is a front elevation view of an electrical box in the extended position with an electrical device therein; and, FIG. 8 is a sectional view taken generally about lines 8-8 in FIG. 7.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Figure 1:
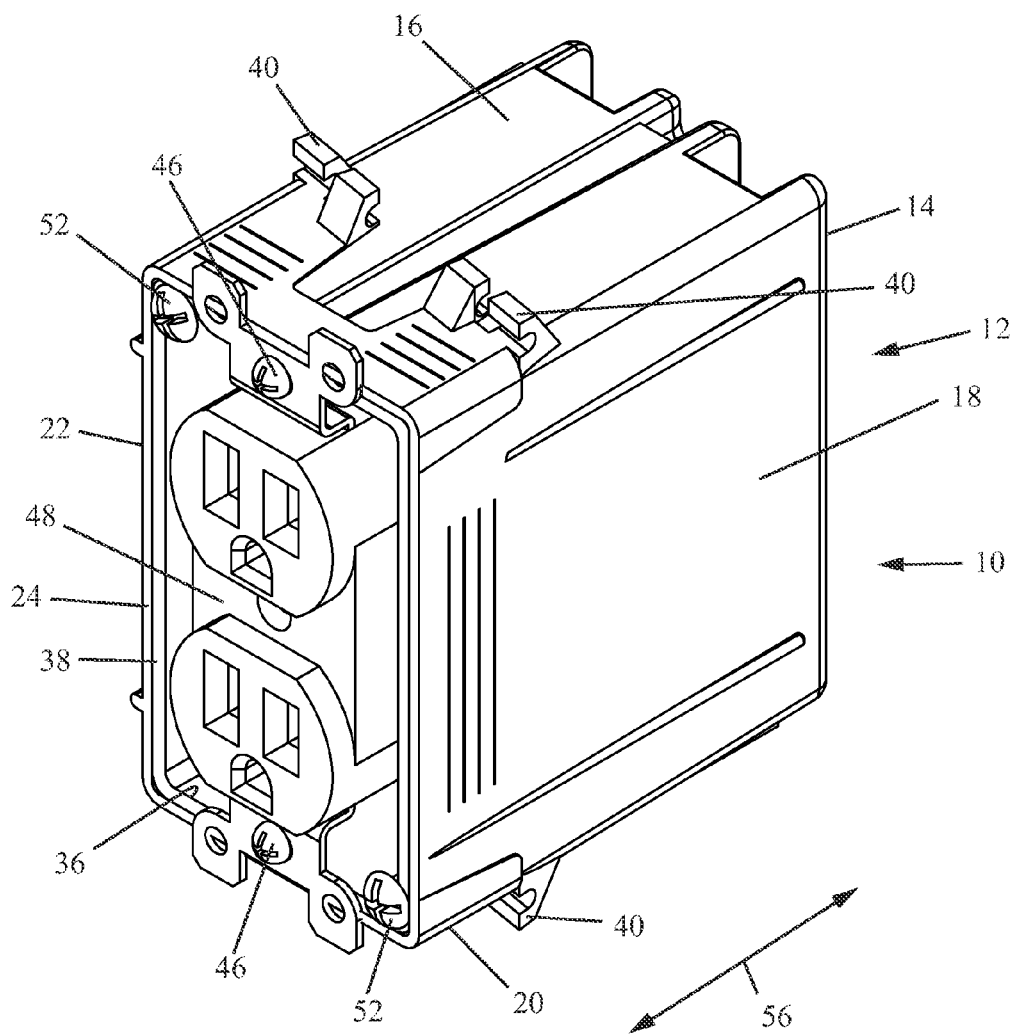
FIG. 1 is a perspective view of an electrical box in the rearmost position with an electrical device therein.
Figure 2:
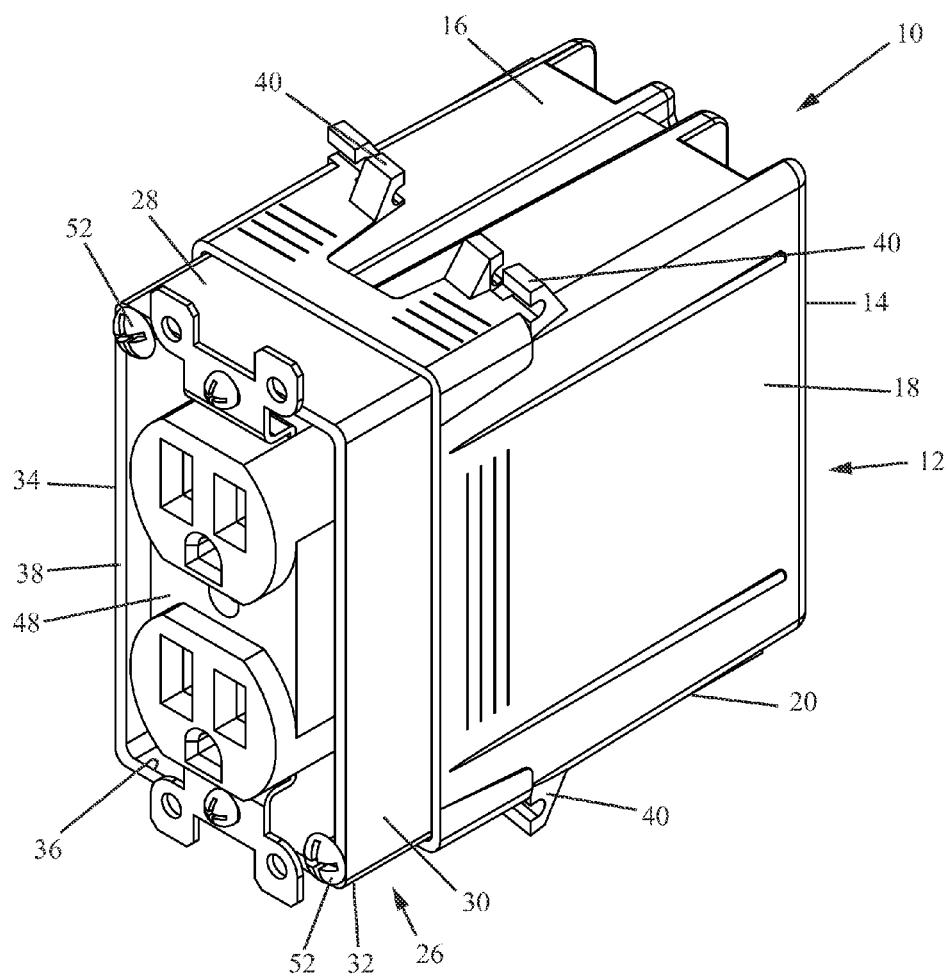
FIG. 2 is a perspective view of an electrical box in the extended position with an electrical device therein.

FIGS. 1 and 2 illustrate perspective views of an electrical box 10 in a rearmost position and a fully extended position, respectively. Electrical box 10 includes an outer shell 12 having a rear wall 14 with a top wall 16, a right wall 18, a bottom wall 20, and a left wall 22 extending forward from the rear wall. The walls include an open top at front surface 24. The electrical box also includes an inner shell 26 having a top wall 28, a right wall 30, a bottom wall 32, and a left wall 34 together defining a cavity 36 and each terminating at an open top partially defined by a front surface 38. In one aspect, the inner shell may include a rear wall and in a second aspect, the inner shell does not require a rear wall.

Figure 3:
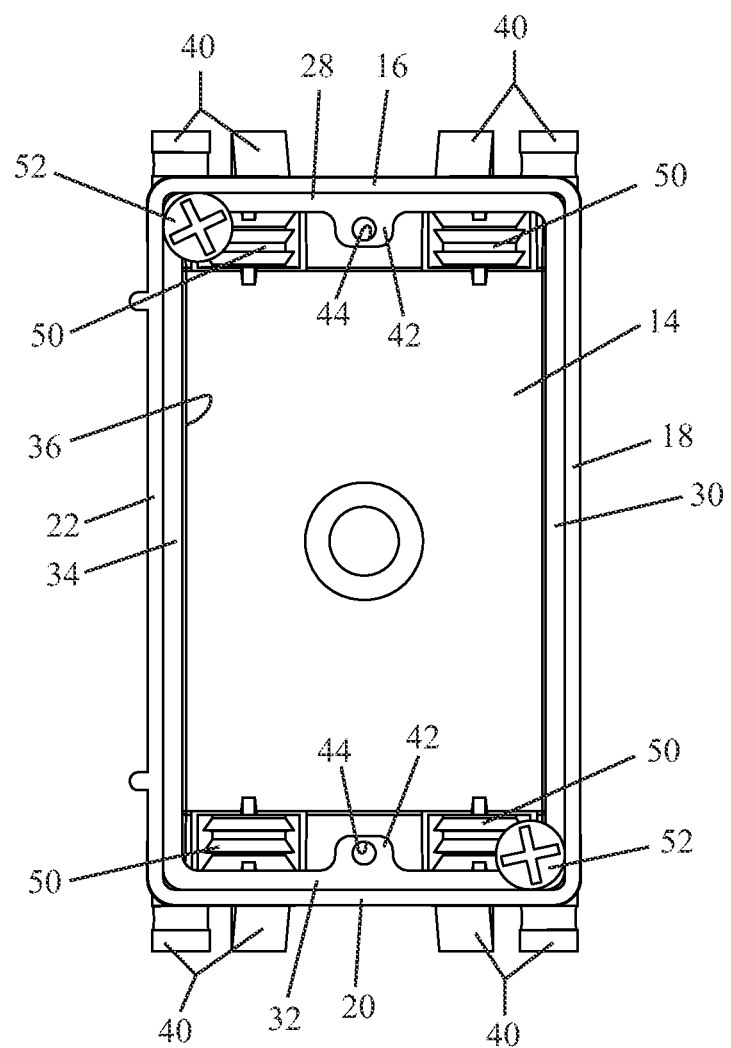
FIG. 3 is a front elevation view of an electrical box without an electrical device.
Figure 4:
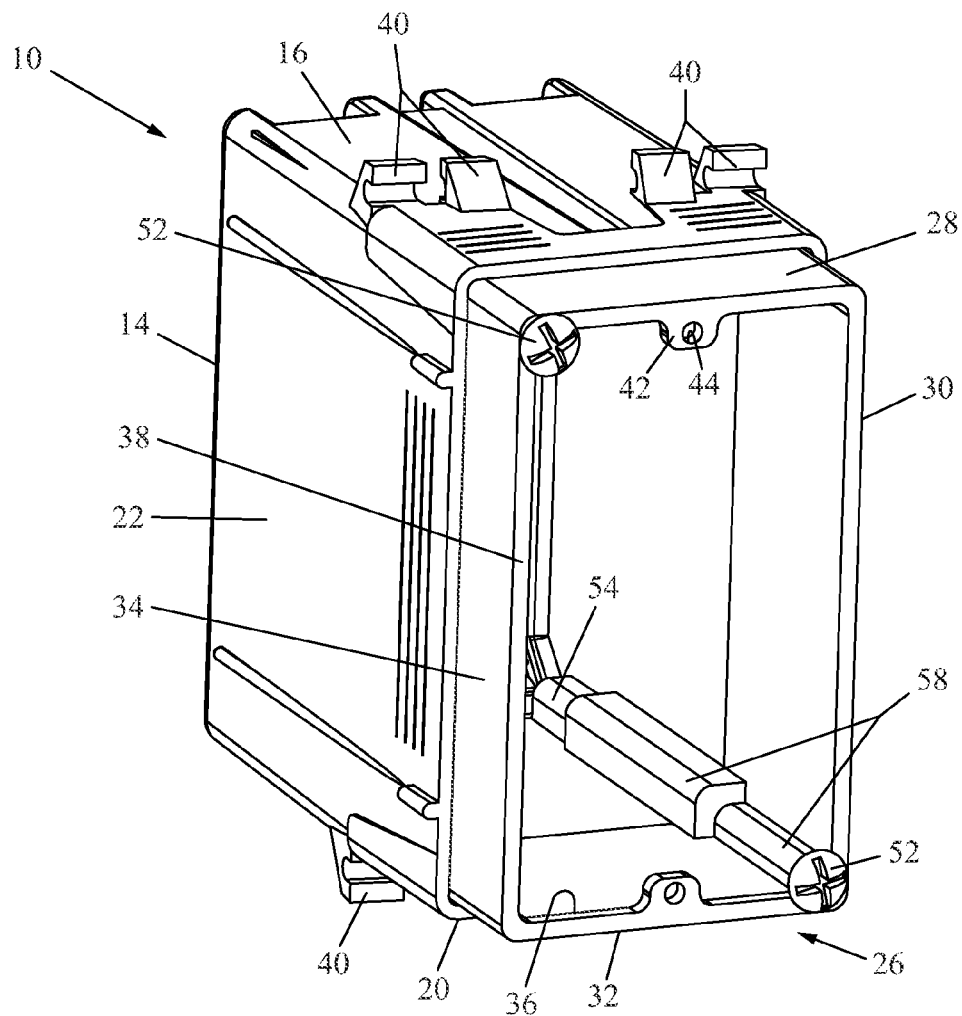
FIG. 4 is a perspective view of an electrical box in the extended position without an electrical device.

Electrical box 10 is mounted to a structural wall with box mounting tabs 40 which extend from top wall 16 and bottom wall 20 of outer shell 12 in a manner known in the art. Inner shell 26 includes a device securing protrusion 42 extending into cavity 36 from top wall 28 and bottom wall 32 as seen in FIG. 3. An opening 44 extends into device securing protrusion 42 and is arranged to receive device screws 46 to mount an electrical device 48 within cavity 36 of inner shell 26. Further, electrical box 10 may include a plurality of cord clamps 50 to secure electrical wiring therein.

Referring to FIGS. 1 through 4, electrical box 10 includes a guide or screw 52 located within cavity 36 of inner shell 26. Outer shell 12 includes a track 54 that is mated therein and along with inner shell 26 provides relative movement in the direction associated with arrows 56. The guide and track arrangement may also include a cover 58 arranged to prevent access to the inner workings of guide 52 and track 54.

FIGS. 5 through 8 illustrate various views of electrical box 10 in the extended and rearmost positions with guide 52 and track 54 complimentary shaped and interconnected to provided relative movement between the inner shell and outer shell as desired.

Figure 6:
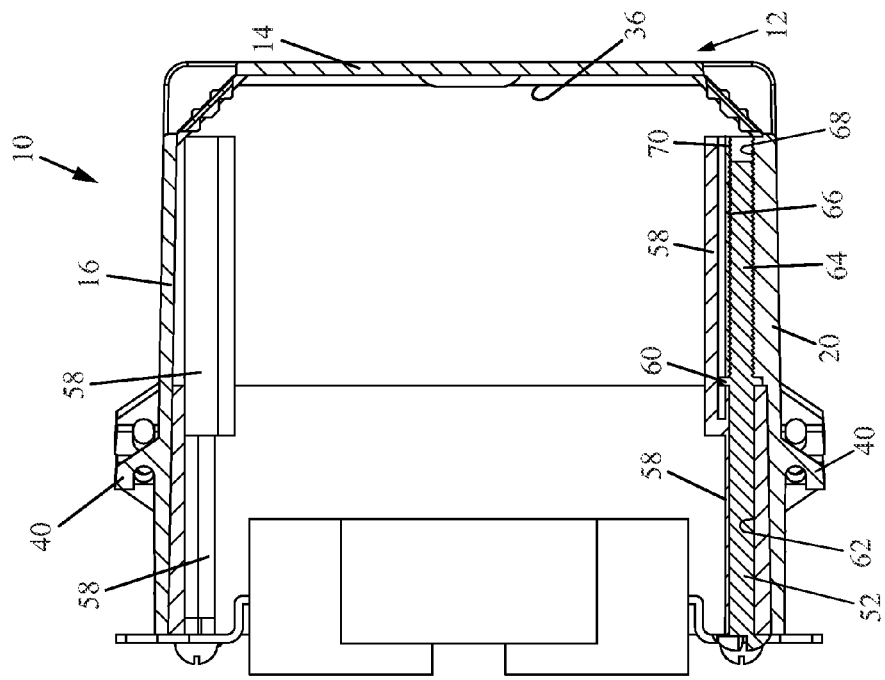
FIG. 6 is a sectional view taken generally about lines 6-6 in FIG. 5.
Figure 5:
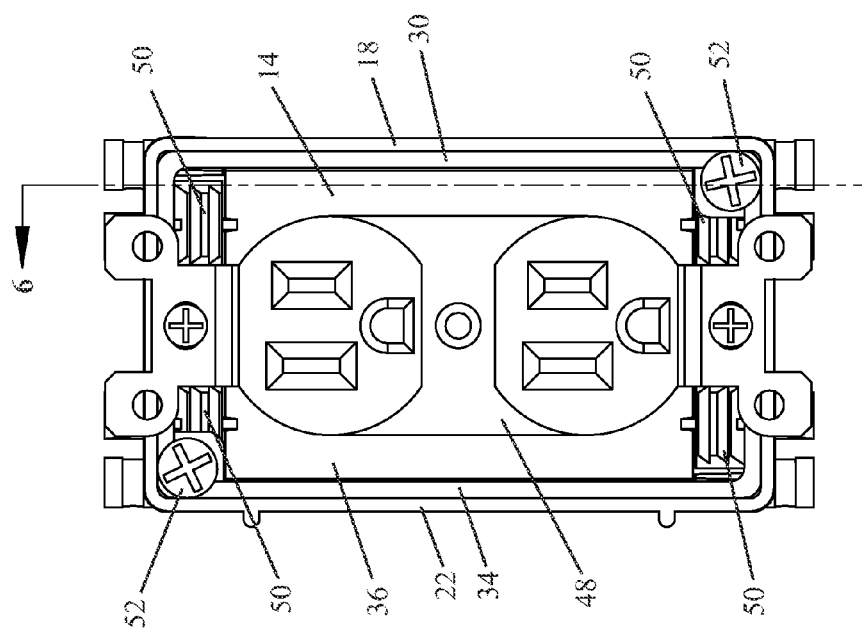
FIG. 5 is a front elevation view of an electrical box in the rearmost position with an electrical device therein.

As is particularly seen in FIGS. 6 and 8, inner shell 26 includes guide 52 with a mounting washer 60 thereon and fitted within aperture 62. Guide 52 also includes a threaded portion 64 with threads 66. Outer shell 12 includes a channel 68 with threads 70 formed on the inner surface. Channel 68 is preferably shaped and sized to receive guide 52 and particularly threaded portion 64. Threads 66 and 70 are arranged to selectively permit movement by rotating guide 52 and prevent movement when guide 52 is not rotated.

In operation, electrical box 10 is fed with electrical wiring before or after mounting the electrical box to a structural wall. A cosmetic wall covering such as drywall, tiling, or the like is installed around the electrical box. The electrical device may then be wired and installed prior to adjusting the electrical box, or the electrical box may be adjusted to the proper position where the front surface is even with the outer surface of the cosmetic wall covering before the electrical device is installed. The installer manipulates the inner shell position through the open top of the inner shell by rotating guide 52 which is threadably engaged with the outer shell. The threaded engagement translates rotational movement into linear movement inwards or outwards from within the inner shell, thus the installer can precisely adjust the placement of the inner shell for the electrical device.

It will be understood that implementations are not limited to the specific components disclosed herein, as virtually any components consistent with the intended operation of a method and/or system implementation for an electrical box may be utilized. Accordingly, for example, it should be understood that, while the drawing figures accompanying text show and describe a rectangular electrical box, an electrical box of the present invention may contain any number of sides. Common electrical box shapes also include round, square, and octagonal. However, an electrical box of the present invention may also be other shapes. Components may comprise any shape, size, style, type, model, version, class, grade, measurement, concentration, material, weight, quantity, and/or the like consistent with the intended operation of a method and/or system implementation for an electrical box.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical box comprising:
an outer shell comprising at least four sides extending from a rear wall to an open top at a front surface and a box mounting tab protruding from two of the at least four sides;
an inner shell slidable within the outer shell between an extended position and a rearmost position, the inner shell comprising at least four sides, a front surface, and at least two device securing protrusions each comprising an opening extending therethrough;
one or more screw covers positioned within the inner shell;
one or more tracks positioned within the outer shell to align with the one or more screw covers, the one or more tracks comprising a threaded channel and sized to fit at least partially within the one or more screw covers when the inner shell is in the rearmost position; and
one or more screws extending through the one or more screw covers and threadedly coupled to the threaded channel of the track, each of the one or more screws comprising a threaded portion and a non-threaded portion separated by a mounting washer extending from the screw, the threaded portion at least partially engaged with the threaded channel and the mounting washer positioned to abut a rear surface of the inner shell when the inner shell is moved toward the extended position.

2. The electrical box of claim 1, further comprising an electrical device movable with the inner shell.

3. The electrical box of claim 1, wherein the one or more tracks are mated with the one or more screws to move the inner shell between the extended position and the rear most position.

4. The electrical box of claim 1, wherein the one or more screws and the one or more tracks are complimentarily shaped.

5. The electrical box of claim 1, wherein the one or more screws retains a relative position with respect to the inner shell.

6. The electrical box of claim 1, wherein the inner shell is moved away from the back wall prior to mounting an electrical device within the inner shell.

7. The electrical box of claim 1, wherein the inner shell is moved away from the back wall after mounting an electrical device within the inner shell.

8. The electrical box of claim 1, wherein the one or more screws is manipulated through the inner shell open top.

9. The electrical box of claim 1, wherein
each of the one or more tracks comprise the threaded channel extending therethrough.

10. The electrical box of claim 9, wherein the one or more tracks are mated with the one or more screws to move the inner shell.

11. The electrical box of claim 10, wherein rotation of the screw is translated into linear movement of the inner shell.

* * * * *